(12) United States Patent
Matsumoto

(10) Patent No.: US 8,491,672 B2
(45) Date of Patent: Jul. 23, 2013

(54) METHOD OF MANUFACTURING METAL FOIL FOR ELECTROLYTIC CAPACITOR

(75) Inventor: Takayuki Matsumoto, Saga (JP)

(73) Assignees: Sanyo Electric Co., Ltd, Osaka (JP); Saga Sanyo Industries Co., Ltd., Saga (JP)

( * ) Notice: Subject to any disclaimer, the term of this patent is extended or adjusted under 35 U.S.C. 154(b) by 1009 days.

(21) Appl. No.: 12/401,696

(22) Filed: Mar. 11, 2009

(65) Prior Publication Data

US 2009/0231783 A1  Sep. 17, 2009

(30) Foreign Application Priority Data

Mar. 12, 2008 (JP) .................................. 2008-63081
Apr. 11, 2008 (JP) ................................ 2008-103093

(51) Int. Cl.
*H01L 21/00* (2006.01)
(52) U.S. Cl.
USPC ............................ 29/25.03; 29/17.8; 29/825
(58) Field of Classification Search
USPC ....................................... 29/17.8, 25.03, 825
See application file for complete search history.

(56) References Cited

U.S. PATENT DOCUMENTS 7,495,892 B2 * 2/2009 Saida et al. .................... 361/528
2007/0030622 A1 * 2/2007 Saida et al. .................... 361/272

FOREIGN PATENT DOCUMENTS

| JP | 58-157519 | | 10/1983 |
| JP | 6-31526 | | 2/1994 |
| JP | 9-141598 | | 6/1997 |
| JP | 10223491 A | * | 8/1998 |
| JP | 2000-182901 | | 6/2000 |
| JP | 2001-71296 | | 3/2001 |
| JP | 2003-94382 | | 4/2003 |
| JP | 2004296611 A | * | 10/2004 |
| JP | 2007-152436 | | 6/2007 |

OTHER PUBLICATIONS

Japanese Office Action for Japanese Application No. 2008-063081 mailed on Mar. 27, 2012.
Japanese Office Action for Japanese Application No. 2008-103093 mailed on Mar. 27, 2012.

* cited by examiner

*Primary Examiner* — Carl Arbes
(74) *Attorney, Agent, or Firm* — Turocy & Watson, LLP

(57) ABSTRACT

The invention provides a method of manufacturing a metal foil for an electrolytic capacitor. In the case of slitting a wide metal strip subjected to etching treatment into a predetermined size with a cutting blade, a slitting portion of the heated wide metal strip is slit to provide the metal foil with few burrs and cracks at the slit edge surface.

13 Claims, 9 Drawing Sheets

METHOD OF MANUFACTURING METAL FOIL FOR ELECTROLYTIC CAPACITOR

BACKGROUND OF THE INVENTION

1. Field of the Invention

The invention relates to a method of manufacturing a metal foil for an electrolytic capacitor, which is used for an anode foil or a cathode foil, and an electrolytic capacitor using the same.

2. Description of the Related Art

In the modern society, automobiles and electric appliances such as televisions and personal computers have been so widely spread as to be indispensable for daily lives. High performance of electronic parts such as electrolytic capacitors greatly contributes to high functionalization of these products.

In a general electrolytic capacitor, a metal foil made of a valve metal such as aluminum, tantalum, titanium and the like is used for an electrode foil. For example, an electrolytic capacitor, produced by forming a capacitor element in which a rectangular anode foil and a rectangular cathode foil are wound, impregnating a driving electrolytic solution between the rectangular anode foil and the rectangular cathode foil and housing the capacitor element in a casing, has been commercialized. Also, a solid electrolytic capacitor containing a solid electrolyte excellent in electric conductivity such as polythiophene and polypyrrole, instead of the driving electrolytic solution, has been commercialized.

A metal foil for use in such electrolytic capacitors, for example, is manufactured by following method. First, a wide metal strip is subjected to etching treatment to widen the surface area. Next, a wide metal strip for an anode foil having an anodic oxide film which is formed by anodizing the surface of the etched wide metal strip and a wide metal strip for a cathode foil which is only performed the etching treatment are prepared. Thereafter, in a slitting step, these respective wide metal strips are slit in predetermined width with a cutting blade. Further, in a cutting step, the slit metal sheets are cut in pieces by a cutting apparatus to produce rectangular metal foils. (See, for example, Japanese Unexamined Patent Publication No. 2007-152436)

Recently, a variety of electronic parts tend to be installed in automobiles and the like for high functionalization. Therefore, electrolytic capacitors with high withstanding voltage having a rated voltage as high as 25 V or 35 V have been required.

However, such electrolytic capacitors with high withstanding voltage have a problem that a short circuit is likely to be caused at the time of manufacture. According to investigations of the present inventor, it is supposed that burrs and cracks produced at a slit edge surface of an anode foil or a cathode foil to be used for manufacturing an electrolytic capacitor with high withstanding voltage are causes of the problem. Specifically, in the case where the anode foil and the cathode foil of an electrolytic capacitor are produced, as described above, by carrying out the slitting step of slitting the wide metal strip subjected to etching treatment in predetermined width, it is required to use metal foils with large etching pits as the anode foil and the cathode foil to produce the electrolytic capacitor with high withstanding voltage. Therefore, when the wide metal strip is slit, the unevenness of the slit edge surface becomes large and accordingly, burrs and cracks tend to be formed at the slit edge surface. Particularly, because the hard anodic oxide film is formed on the surface of the wide metal strip for the anode foil, the cutting blade becomes dull and whereby, burrs and cracks are easy to be formed at the slit edge surface.

In the case where the metal foil having burrs and cracks at the slit edge surface is used to manufacture an electrolytic capacitor, both electrode foils are electrically conducted with the burrs and whereby, a leak current tends to be increased or a short circuit tends to be occur. Further, due to progression of cracks, the leak current tends to be further increased and the capacity tends to be lowered. Therefore, in the industrial manufacture, there is a problem that defective products causing the short circuit and the like tend to be increased and the production yield tends to be lowered.

SUMMARY OF THE INVENTION

The present invention has been made to solve the above-mentioned problems and an object of the present invention is to manufacture a metal foil for an electrolytic capacitor having less burrs and cracks at a slit edge surface when slitting a wide metal strip subjected to etching treatment with a cutting blade and to decrease the number of defective products causing problems such as short circuit.

According to one aspect of the present invention, there is provided a method for manufacturing a metal foil for an electrolytic capacitor, comprising:

slitting a wide metal strip subjected to etching treatment into a predetermined size with a cutting blade, wherein the slitting portion of the wide metal strip to be brought into contact with the cutting blade is heated.

According to another aspect of the present invention, there is provided a method for manufacturing a metal foil for an electrolytic capacitor, comprising:

supplying a solvent to a wide metal strip subjected to etching treatment to fill an etched portion of the wide metal strip with the solvent; and slitting the wide metal strip filled with the solvent in the etched portion into a predetermined size between a cutting blade and a cutting blade receiving member disposed opposite to the cutting blade.

According to the present invention, it is made possible to decrease occurrence of burrs and cracks at a slit edge surface. Therefore, it is made possible to decrease defective products causing problems such as short circuit.

Other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE PREFERRED EMBODIMENTS

An etching treatment for a wide metal strip to be employed may be a conventionally known chemical etching method or an electrolytic etching method. For example, a wide metal strip made of a valve metal such as aluminum, tantalum, titanium and the like is electrochemically treated in an aqueous acidic solution containing an acid such as sulfuric acid, nitric acid, phosphoric acid, oxalic acid, and the like to form a large number of pores on the surface of the wide metal strip and whereby, the surface area of the wide metal strip is widen. As described above, since large etching pits are formed in the metal foil for an electrolytic capacitor with high withstanding voltage, the unevenness at the slit edge surface becomes large. Further, the wide metal strip for an anode foil has high hardness since the hard anodic oxide film is formed on the surface of the wide metal strip. Therefore, burrs and cracks are easy to be formed at the slit edge surface. Particularly, in recent years, a wide metal strip having etching pits with a size of 0.3 to 5 μm formed by the etching treatment and a thickness of 80 to 150 μm for large capacity is likely to be employed. Therefore, the cutting blade tends to be worn out quickly. Furthermore, the stiffness of the wide metal strip is weakened due to the above-mentioned treatment for increase of porosity portion and the cutting blade tends to be hooked in the etched portion. From these points of view, burrs and cracks are easy to be formed at the slit edge surface. Accordingly, in the case where a thick metal strip having the etching pits with the above-mentioned size is used, the manufacturing methods of the present embodiments are particularly effective. When the wide metal strip is used for the anode metal strip, the wide metal strip is further subjected to anodizing treatment after the etching treatment to form an anodic oxide film on the surface of the wide metal strip. Hereinafter, embodiments of the invention will be described in detail.

Embodiment 1

In this embodiment, a wide metal strip subjected to etching treatment in a manner described above is heated in the slitting step of slitting the wide metal strip into a predetermined size with a cutting blade and a slitting portion in the heated state is slit with the cutting blade. Owing to the heating of the wide metal strip, the hardness of the wide metal strip can be lowered and therefore, the slitting property can be improved. Consequently, occurrence of burrs and cracks at the slit edge surface can be lessened.

Figure 1:
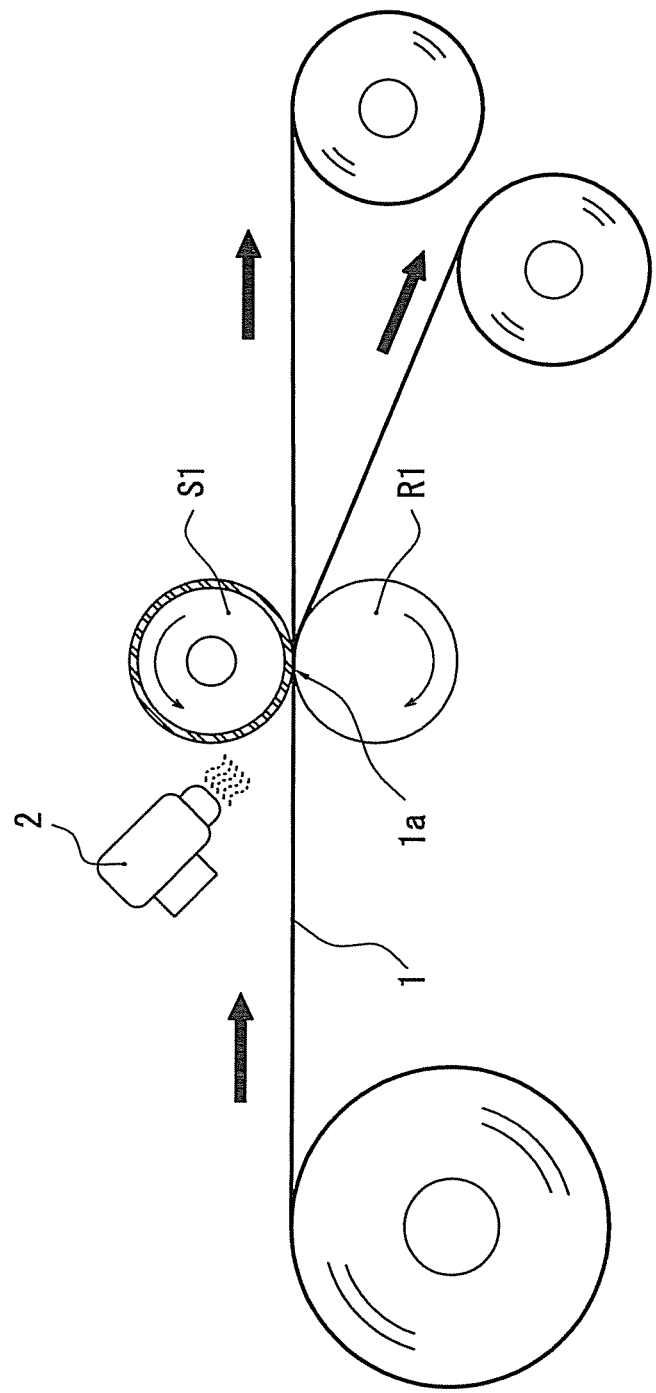
FIG. 1 is a schematic view showing one example of a manufacturing method according to an embodiment 1 of the invention.
Figure 2:
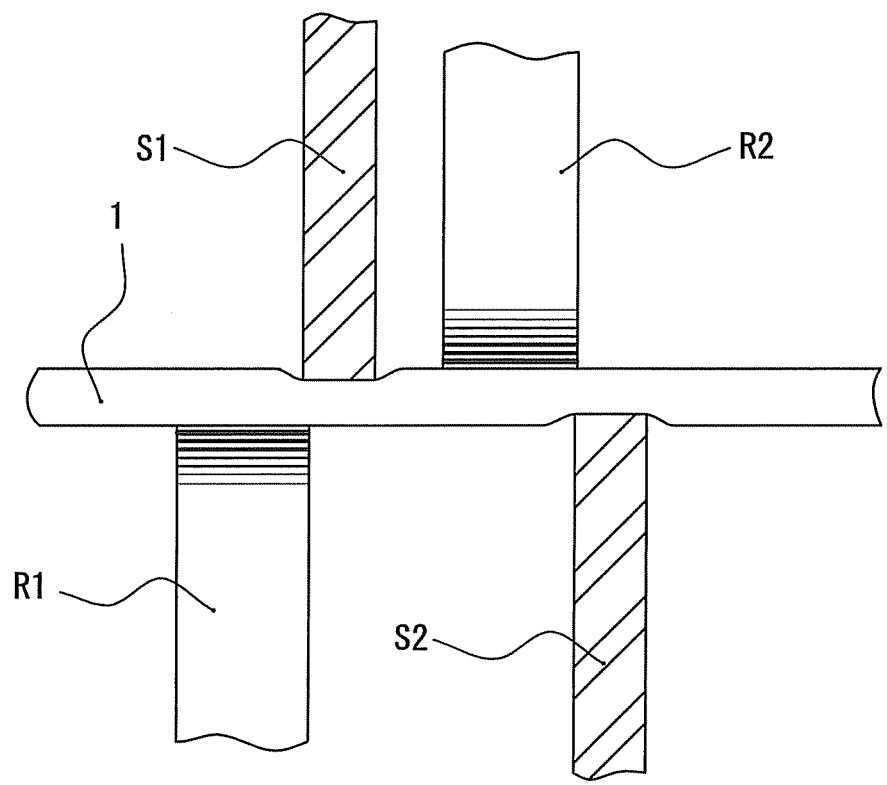
FIG. 2 is a partial schematic view showing a slit state of a wide metal strip observing a manufacturing apparatus of FIG. 1 from a feeding direction of the wide metal strip.

FIG. 1 is a schematic view showing one example of the manufacturing method of the present embodiment and FIG. 2 is a partial schematic view showing the slit state of a wide metal strip 1 observing the manufacturing apparatus of FIG. 1 from the feeding direction of the wide metal strip 1. The manufacturing apparatus of FIG. 1 is a manufacturing apparatus of so-called roll-to-roll type for carrying out unwinding and winding the strip in single apparatus. As shown in FIG. 2, the manufacturing apparatus includes, as a slitting means, a plurality of first cutting blades S1, which are rotary blades having blade parts in the peripheries to be brought into contact with the one plane of the wide metal strip 1, and a plurality of first rotating support rolls R1, which are cutting blade receiving members, installed on the opposite to the first cutting blades S1 and to be brought into contact with the other plane of the wide metal strip 1, respectively. Further, as shown in FIG. 2, this manufacture apparatus includes a plurality of a pair of a slitting means each composed of a second cutting blade S2 and a second rotating support roll R2 reversed upside down to those of a pair of the first cutting blade S1 and the first rotating support roll R1. The cutting blades S1 and S2 to be used may be conventionally known cutting blades made of carbide steels, high speed steels, die steels and the like. As shown in FIG. 1, the manufacturing apparatus is provided with a blower 2 as a heating means for blowing hot air to a slitting portion 1a where the wide metal strip 1 and these cutting blades S1 and S2 are brought into contact with each other for heating the wide metal strip 1. Alternatively, the blower 2 may be installed in a further upstream side if it can increase the temperature of the slitting portion 1a. At the time of slitting the wide metal strip 1, the wide metal strip 1 is fed at a constant speed between the cutting blades S1, S2 and rotating support rolls R1, R2 separated at predetermined intervals in the vertical direction and hot air is supplied to the slitting portion 1a by the blower 2 to heat the wide metal strip 1. Thereafter, the cutting blades S1, S2 and rotating support rolls R1, R2 are made closer and whereby, shearing force is applied to the slitting portion 1a from the cutting blades S1 and S2 to slit the wide metal strip 1 into the predetermined width. At that time, since the wide metal strip 1 in the slitting portion 1a has lowered hardness due to the heat from the blower 2, the wide metal strip 1 can be slit with a good slitting property. The heating temperature is not particularly limited; however if it is too high, the wide metal strip 1 is expanded and thus it becomes difficult to slit the wide metal strip 1 accurately into the predetermined size. Therefore, it is preferable to heat the wide metal strip 1 in a manner that the temperature in the vicinity of the slitting portion 1a becomes 40 to 150° C. and it is more preferable to heat the wide metal strip 1 in a manner that the temperature in the vicinity of the slitting portion 1a becomes 70 to 100° C.

Figure 3:
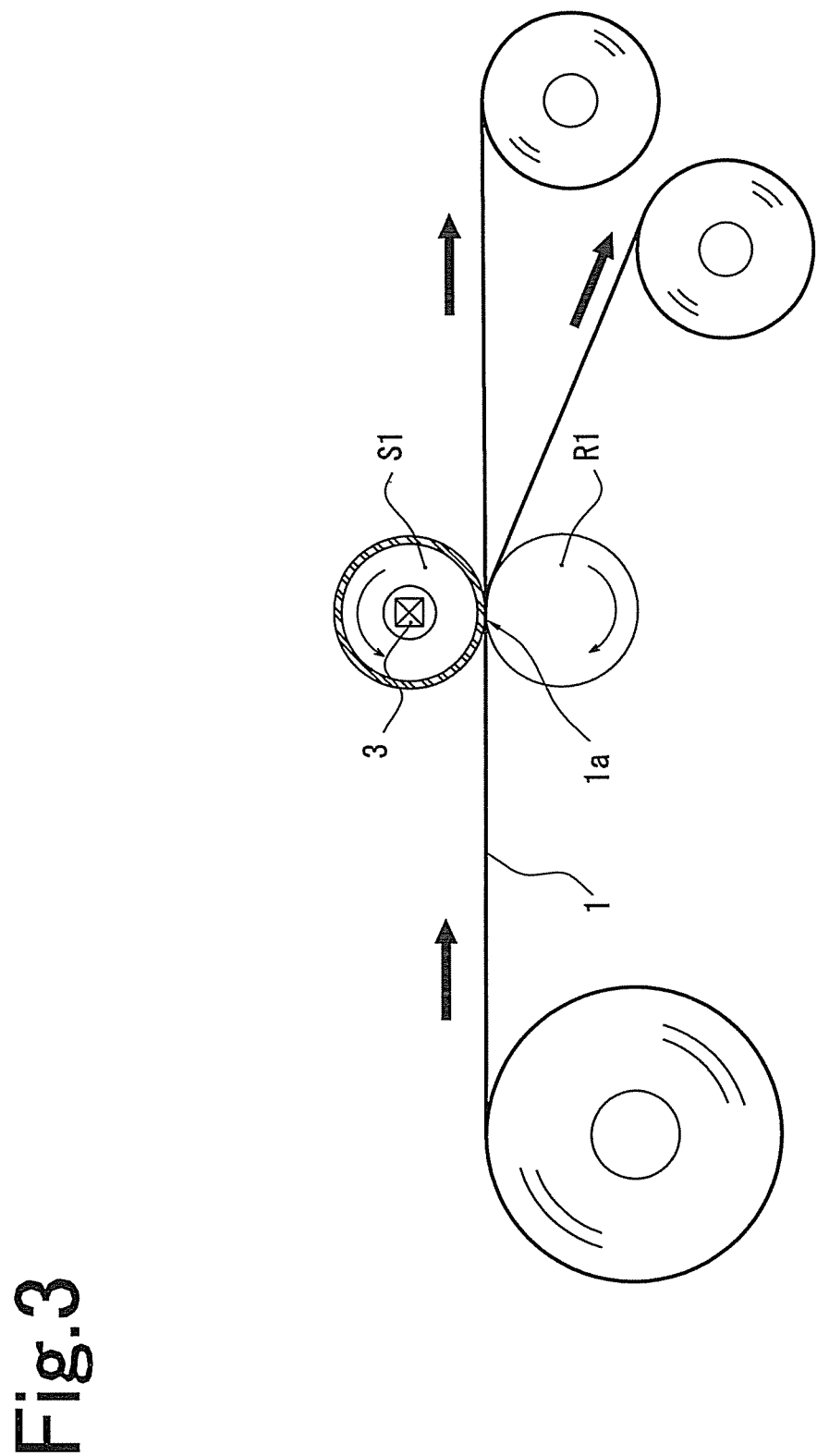
FIG. 3 is a schematic view showing another example of a manufacturing method according to the embodiment 1 of the invention.

FIG. 3 is a schematic view showing another example of the manufacturing method of the present embodiment. In FIG. 3, the same components as those of FIG. 1 are designated by the same reference numerals as those used in FIG. 1 for omission of detailed description thereon. In this manufacturing apparatus, a heater 3 is installed in the inside of the respective rotary shaft of the cutting blades S1, S2. Accordingly, with the heated first cutting blades S1 and second cutting blades S2, the slitting portion 1a of the wide metal strip 1 to be brought into contact with these cutting blades S1, S2 is heated and consequently, the hardness of the wide metal strip 1 can be lowered.

Embodiment 2

In this embodiment, in a slitting step of slitting a wide metal strip subjected to etching treatment described above into a predetermined size, a solvent is supplied to the wide metal strip to fill the etched portion of the wide metal strip and the wide metal strip filled with the solvent in the etched portion is slit between a cutting blade and a cutting blade receiving member disposed opposite to the cutting blade. By supplying the solvent to the wide metal strip, the etched portion is filled with the solvent and whereby, pores of the etched portion are filled with the solvent and accordingly, the wide metal strip is provided with stiffness. This is supposed that a phenomenon similar to that a slit edge surface of a sponge impregnated with water becomes more flat than that of a dry sponge occurs in the etched portion filled with the solvent. Further, in the case of slitting the wide metal strip between the cutting blade and the cutting blade receiving member, since the etched portion is filled with the solvent, the wide metal strip in the slitting portion adheres to the cutting blade receiving member and therefore, the wide metal strip can be closely stuck to the cutting blade receiving member. Accordingly, the slitting property with the cutting blade can be improved and consequently, occurrence of burrs and cracks at the slit edge surface can be lessened.

Figure 4:
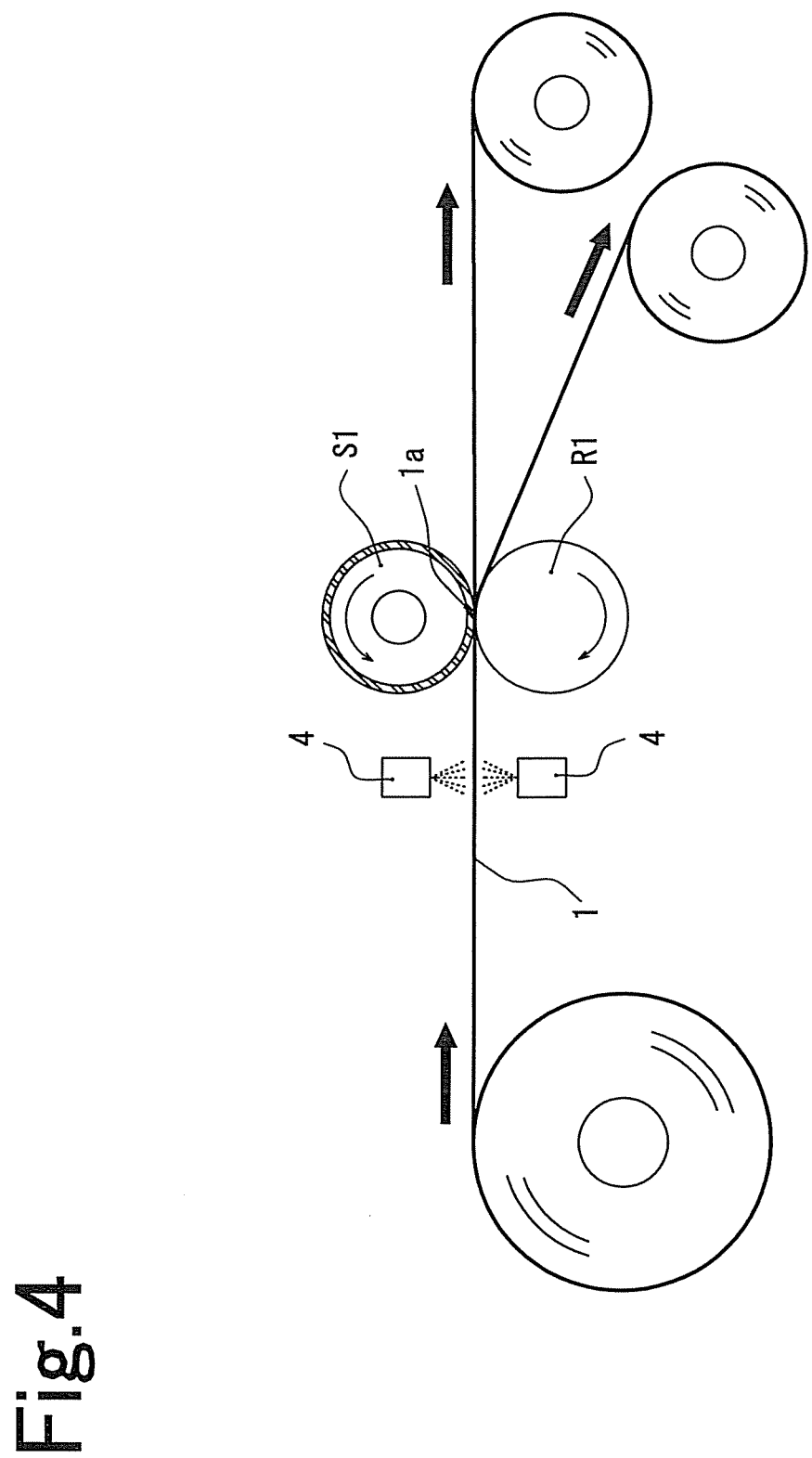
FIG. 4 is a schematic view showing one example of a manufacturing method according to an embodiment 2 of the invention.

FIG. 4 is a schematic view showing one example of the manufacturing method of the present embodiment. The configuration is same as those of FIGS. 1 and 2 of the embodiment 1, except that a solvent supply means is installed in place of the heating means. In FIG. 4, the same components as those of FIG. 1 are designated by the same reference numerals as those used in FIG. 1 for omission of detailed description thereon. As shown in FIG. 4, in this manufacturing apparatus, spray type solvent supply means 4, 4 for supplying a solvent to the respective planes of the wide metal strip 1 upstream of the slitting portion 1a are installed. Accordingly, when the wide metal strip 1 is fed toward a gap between cutting blades S1, S2 and rotating support rolls R1, R2, a solvent is supplied to the wide metal strip 1 from the solvent supply means 4, 4, so that the respective planes of the wide metal strip 1 are wet with the solvent and the pores of the etched portion are filled with the solvent. With this, the wide metal strip 1 is provided with the stiffness. Further, since the respective planes of the wide metal strip 1 are wet with the solvent, the wide metal strip 1 in the slitting portion 1a adheres to the surfaces of the rotating support rolls R1, R2 and the wide metal strip 1 is in the state that it is closely attached to the surfaces of the rotating support rolls R1, R2. As a result, the wide metal strip 1 in the slitting portion 1a is fixed on the rotating support rolls R1, R2 and whereby, the slitting property can be improved.

Figure 5:
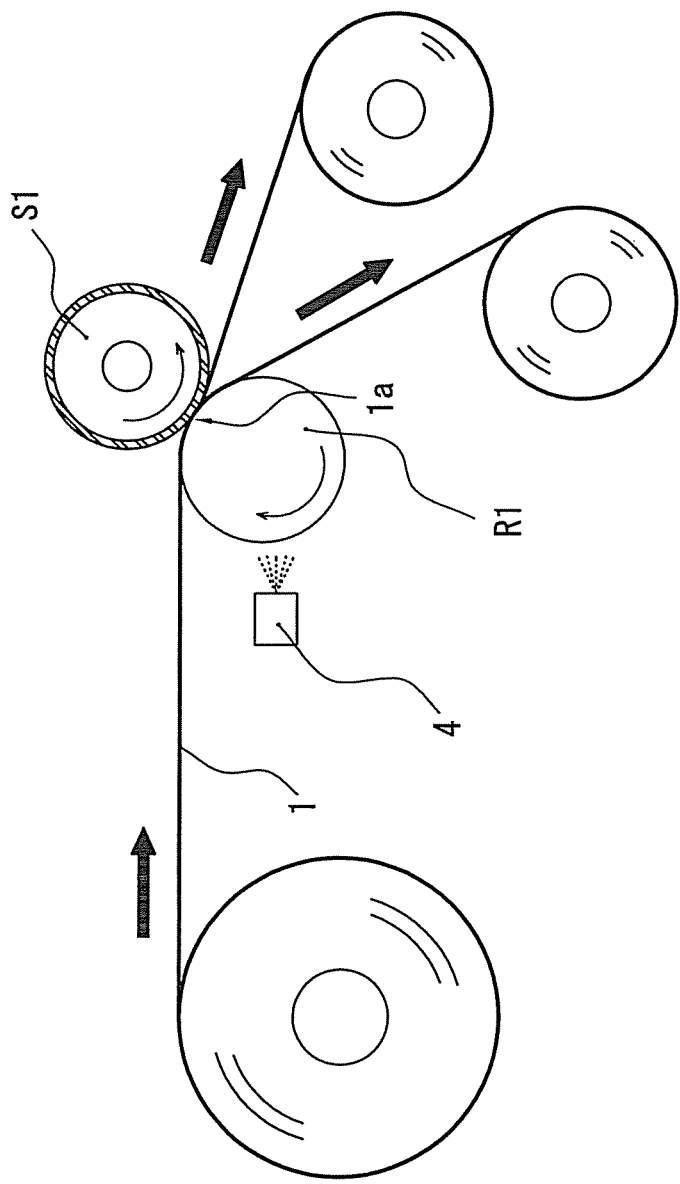
FIG. 5 is a schematic view showing another example of a manufacturing method according to the embodiment 2 of the invention.

FIG. 5 is a schematic view showing another example of the manufacturing method of the present embodiment. In FIG. 5, the same components as those of FIG. 1 are designated by the same reference numerals as those used in FIG. 1 for omission of detailed description thereon. This manufacturing apparatus includes a solvent supply means 4 for supplying a solvent to the surface of the first rotating support roll R1, installed adjacently to the first rotating support roll R1. In addition, although not being illustrated, a solvent supply means for supplying a solvent to the surface of the second rotating support roll R2 is installed adjacently to the second rotating support roll R2. Accordingly, at the time when the rotating support rolls R1, R2 are brought into contact with the wide metal strip 1, respectively, the solvent supplied to the surfaces of the rotating support rolls R1, R2 is transferred to the respective planes of the wide metal strip 1, so that the wide metal strip 1 can closely adhere to the rotating support rolls R1, R2 and the etched portion can be filled with the solvent.

The solvent to be used is not particularly limited if it is a solvent having volatility and being a liquid in normal temperature. Examples thereof include alcohols such as methanol, ethanol and isopropanol; ketones such as acetone and methyl ethyl ketone; and water. These solvents can be used singly or in combination of 2 or more kinds.

The supply amount of the solvent may be altered properly in accordance with the degree of the etching of the wide metal strip and thus is not particularly limited; however, it is preferably, 2.5 to 10.0 μl per 1 cm$^2$ in one plane of the wide metal strip and more preferably 2.5 to 4.5 μl per 1 cm$^2$ in one plane of the wide metal strip. If the supply amount of the solvent is 2.5 μl/cm$^2$ or higher, not only can the adhesion property of the wide metal strip and the cutting blade receiving member be further improved but also the etched portion can be sufficiently filled with the solvent. On the other hand, if the supply amount of the solvent is 10.0 μl/cm$^2$ or lower, scattering of the solvent is suppressed at the time of slitting and adhesion of the slitting dust to the wide metal strip can be further suppressed.

Embodiment 3

The manufacturing method of the present embodiment is a manufacturing method combining the configurations of the above-mentioned embodiments 1 and 2. Specifically, in the present embodiment, in the slitting step of slitting the wide metal strip subjected to etching treatment into a predetermined size with a cutting blade as described above, a solvent is supplied to the wide metal strip to fill the etched portion with the solvent, the wide metal strip is heated and the slitting portion in the heated state is slit with the cutting blade. In this embodiment, the supply of the solvent to the wide metal strip may be either before or after heating of the wide metal strip.

According to the present embodiment, as described in the above-mentioned embodiment 1, since the wide metal strip is heated, the hardness of the wide metal strip can be lowered. Further, as described in the above-mentioned embodiment 2, by supplying a solvent to the wide metal strip, the etched portion is filled with the solvent and whereby, pores of the etched portion are filled with the solvent. Accordingly, the wide metal strip is provided with stiffness. Furthermore, by using a rotating support roll disposed opposite to the cutting blade, the wide metal strip 1 is in the state that it is closely attached to the surface of the rotating support roll. As a result, the wide metal strip in the slitting portion is fixed on the rotating support roll. Accordingly, the slitting property can be significantly improved.

Figure 6:
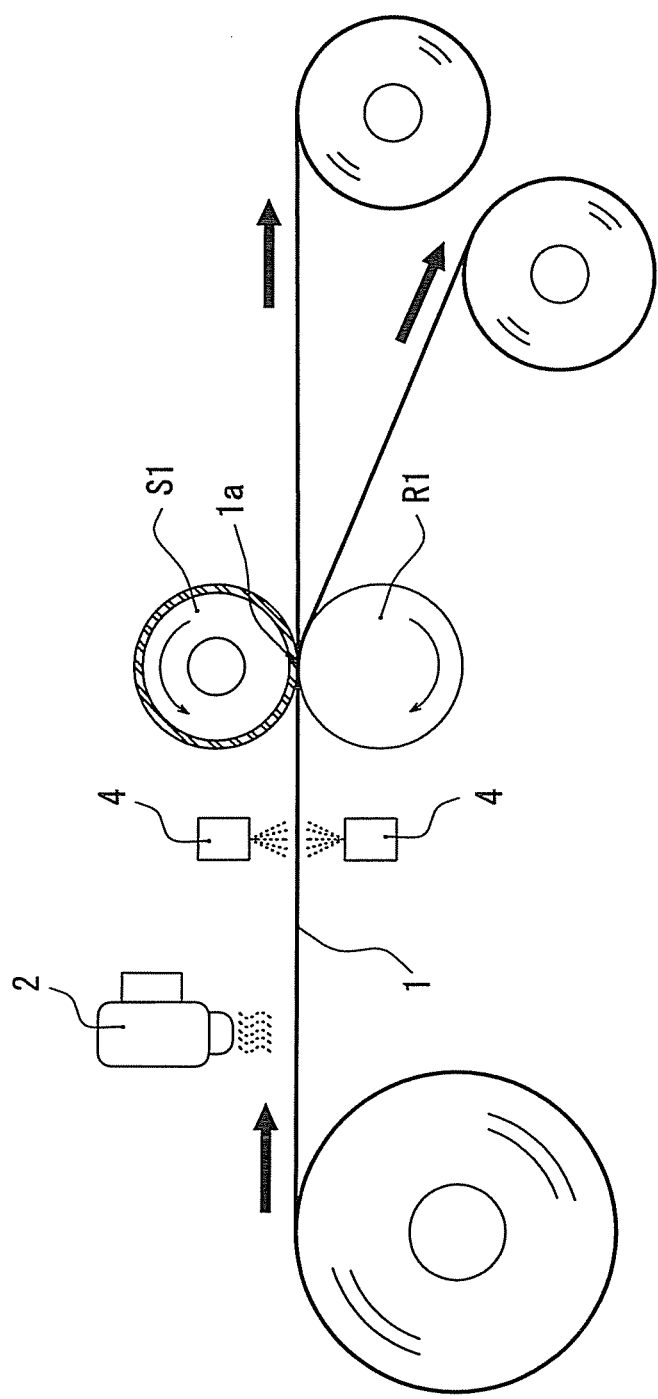
FIG. 6 is a schematic view showing one example of a manufacturing method according to an embodiment 3 of the invention.

FIG. 6 is a schematic view showing one example of the manufacturing method of the present embodiment. In FIG. 6, the same components as those of FIG. 1 are designated by the same reference numerals as those used in FIG. 1 for omission of detailed description thereon. In the manufacturing apparatus, solvent supply means 4, 4 for supplying a solvent to respective planes of the wide metal strip 1 are installed downstream of the blower 2. Accordingly, when the wide metal strip 1 is fed toward a gap between cutting blades S1, S2 and rotating support rolls R1, R2, first, hot air is supplied to the wide metal strip 1 by the blower 2 to heat the wide metal strip 1. With this, the hardness of the wide metal strip 1 can be lowered. Next, a solvent is supplied to the heated wide metal strip by the solvent supply means 4, 4. With this, the respective planes of the wide metal strip 1 are wet with the solvent and whereby, pores of the etched portion are filled with the solvent. Consequently, the wide metal strip 1 is provided with stiffness. Further, since the respective planes of the wide metal strip 1 are wet with the solvent, the wide metal strip 1 in the slitting portion 1a adheres to the surfaces of the rotating support rolls R1, R2 and the wide metal strip 1 is in the state that it is closely attached to the surfaces of the rotating support rolls R1, R2. As a result, the slitting property can be improved.

In the present embodiment, the heating temperature of the wide metal strip, the type of the solvent and the supply amount same as those in the configurations of the embodiments 1 and 2 may be employed.

Figure 7:
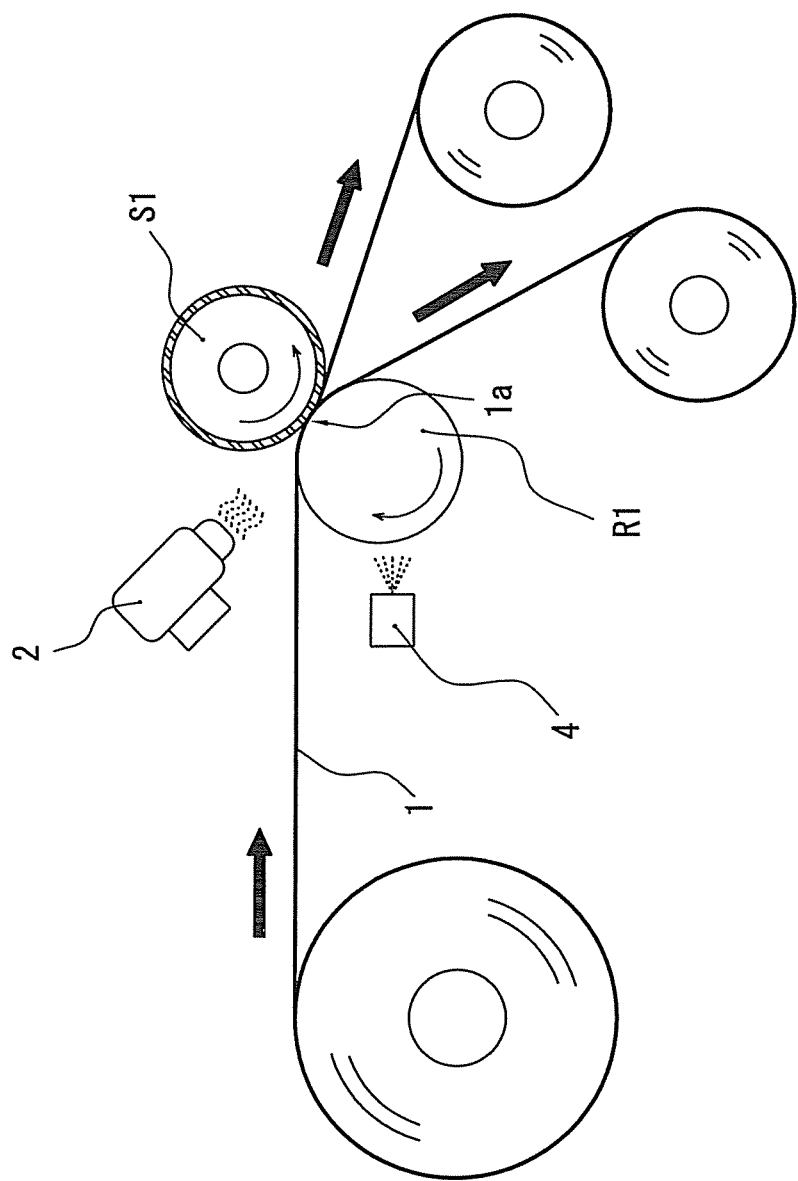
FIG. 7 is a schematic view showing another example of a manufacturing method according to the embodiment 3 of the invention.

FIG. 7 is a schematic view showing another example of the manufacturing method of the present embodiment. In FIG. 7, the same components as those of FIG. 1 are designated by the same reference numerals as those used in FIG. 1 for omission of detailed description thereon. This manufacturing apparatus includes a solvent supply means 4 for supplying a solvent to the surface of a first rotating support roll R1, installed adjacently to the first rotating support roll R1. In addition, although not being illustrated, a solvent supply means for supplying a solvent to the surface of a second rotating support roll R2 is installed adjacently to the second rotating support roll R2. Accordingly, at the time when the rotating support rolls R1, R2 are brought into contact with the wide metal strip 1, respectively, the solvent supplied to the surfaces of the rotating support rolls R1, R2 is transferred to the respective planes of the wide metal strip 1, so that the wide metal strip 1 can closely adhere to the rotating support rolls R1, R2 and the etched portion can be filled with the solvent.

Further, as shown in FIG. 7, the manufacturing apparatus is provided with a blower 2 as a heating means for blowing hot air to a slitting portion 1a where the wide metal strip 1 and these cutting blades S1, S2 are brought into contact with each other for heating the wide metal strip 1. With this, the hardness of the wide metal strip 1 can be lowered.

Other Embodiments (i) In the above-mentioned embodiments, a blower and a heater installed in a cutting blade are used as a heating means for heating a slitting portion; however, the heating means is not limited to them. For example, in a manufacturing apparatus of FIG. 1, heating means such as infrared heating units and electric heaters may be used to heat a wide metal strip. Further, in a manufacturing apparatus of FIG. 3, a shaft of a cutting blade may be heated by heating medium. Furthermore, in a manufacturing apparatuses of FIGS. 1, 3, 6 and 7, a cutting blade receiving member may be heated to heat a wide metal strip.

Figure 8:
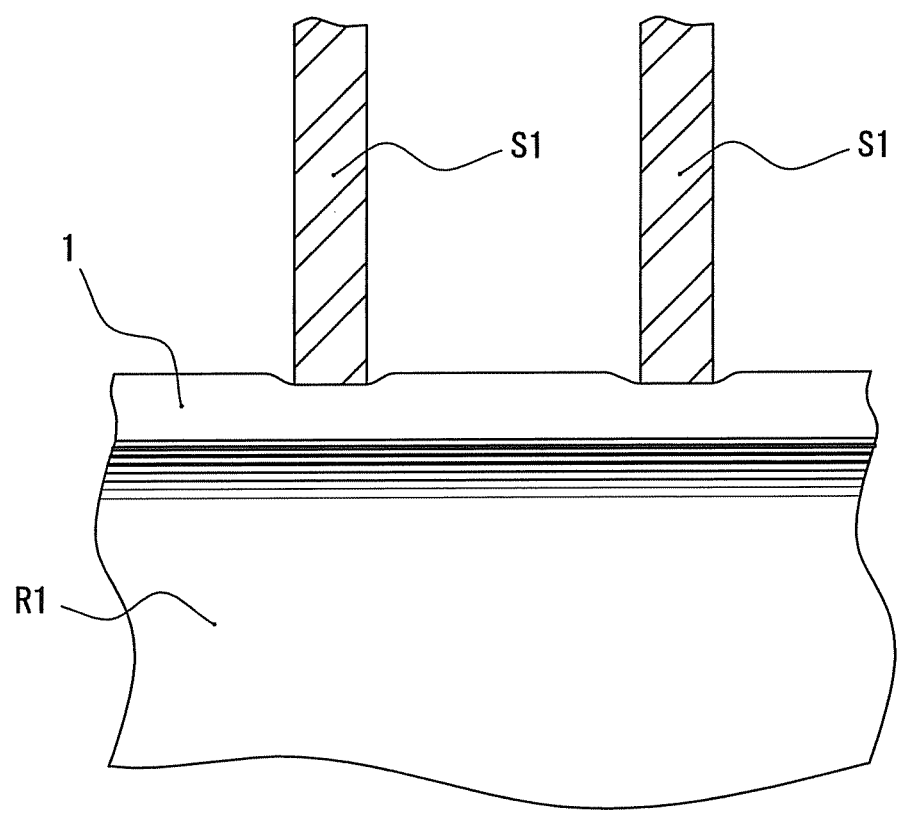
FIG. 8 is a partial schematic view showing another example of a cutting means according to the invention.

(ii) In the above-mentioned embodiments, cutting blades S1, S2 are disposed on respective sides of a wide metal strip 1; however, cutting blades may be disposed on one side of the wide metal strip 1. Further, as shown in FIG. 8, a slitting means only having a cutting blade S1 disposed on one side of the wide metal strip 1 and a cutting blade receiving member R1 disposed on other side of the wide metal strip 1 may be used.

Figure 9:
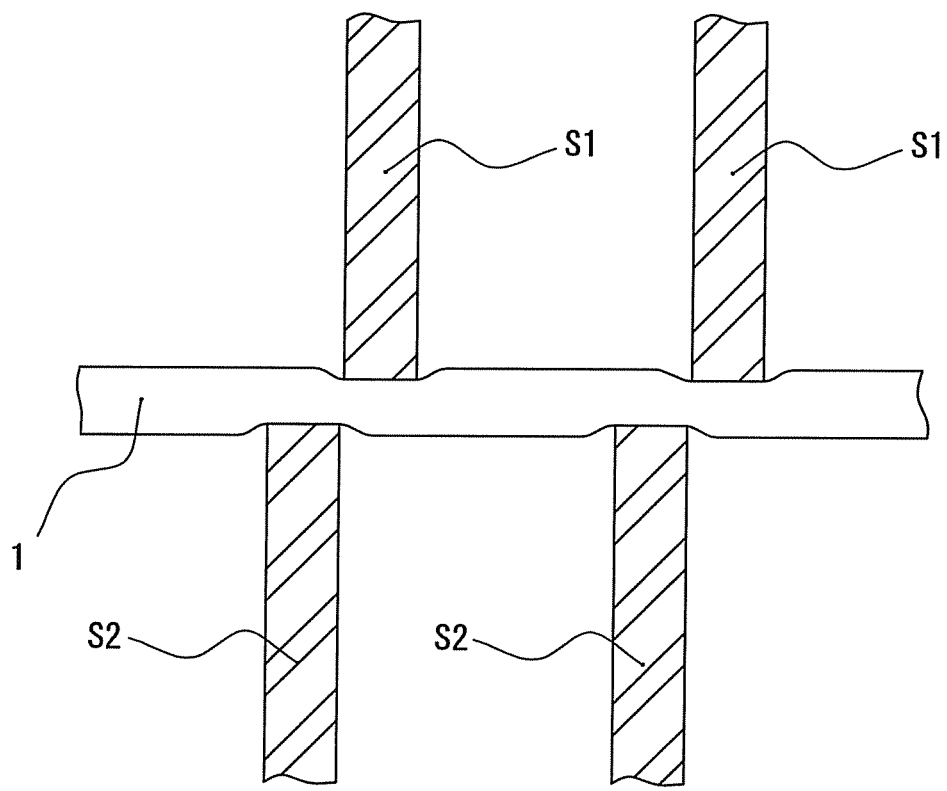
FIG. 9 is a partial schematic view showing further another example of a cutting means according to the invention.

(iii) In the above-mentioned embodiments, a slitting means having a cutting blade and a cutting blade receiving member disposed opposite to the cutting blade is used; however, the slitting means is not limited to them. For example, as shown in FIG. 9, a slitting means having a cutting blade S1 and a cutting blade S2 disposed opposite to the cutting blade S1 may be used.

(iv) In the above-mentioned embodiments, as shown in FIGS. 4 to 7, a solvent is supplied to both planes of the wide metal strip. Alternatively, a solvent may be supplied only to one plane of the wide metal strip.

(Manufacture of Electrolytic Capacitor)

In the present embodiment, a slit metal sheet slit by the above-mentioned method is cut in pieces by a cutting apparatus to produce a rectangular metal foil. According to the method of the above-mentioned embodiments, occurrence of burrs and cracks at the slit edge surface can be lessened. Accordingly, if the metal foil obtained from the slit metal sheet is used for either or both of an anode foil and a cathode foil, it is made possible to decrease the number of defective products causing problems such as short circuit.

When a wound type electrolytic capacitor is produced, a metal foil obtained from a wide metal strip subjected to etching treatment and anodizing treatment is used for an anode foil and a metal foil obtained from a wide metal strip only subjected to etching treatment is used for a cathode foil. Next, a lead tub is respectively attached to the metal foils. Further, a capacitor element is formed by winding the anode foil and the cathode foil with a separator therebetween. After that, the capacitor element is subjected to electrochemical treatment and thermal treatment at 150 to 300° C. and then, a driving electrolytic solution is impregnated in the capacitor element. After a rubber packing is inserted into the lead tubs and the capacitor element is held in a casing, drawing and curling processes are performed on the casing to produce the wound type electrolytic capacitor. A solid electrolytic capacitor can be produced by impregnating a polymerization solution containing a polymerizable monomer such as pyrrole, thiophene and pyrrole and an oxidizing agent such as ferric paratoluenesulfonate into the capacitor element and polymerizing the monomer to form a solid electrolyte between the anode foil and the cathode foil, instead of impregnating the driving electrolytic solution. A laminated type electrolytic capacitor can be produced by laminating a plurality of the anode foils and the cathode foils.

In the following, examples and comparative examples are used to describe the present invention in more detail. The present invention, however, is not limited to them.

EXAMPLES

Example 1

A wide aluminum strip subjected to etching treatment and anodizing treatment (thickness 120 μm, etching pit: 1 μm) was slit in a predetermined width by using a manufacturing apparatus shown in FIG. 1 (cutting blades: high speed steel). At the time of slitting, hot air was blown to the wide metal strip by the blower in such a manner that the temperature of the wide metal strip was at 80° C.

Example 2

The wide metal strip was slit in the same manner as in Example 1, except that ethanol was supplied to the wide metal strip from the solvent supply means in such a manner that the supply amount of the solvent in one plane of the wide metal strip was 2.5 μl/cm$^2$ by using the manufacturing apparatus shown in FIG. 6.

Example 3

The wide metal strip was slit in the same manner as in Example 1, except that ethanol was supplied to the rotating support rolls from the solvent supply means in such a manner that the supply amount of the solvent in one surface of the wide metal strip was 3.5 μl/cm$^2$ by using the manufacturing apparatus shown in FIG. 7.

Example 4

The wide metal strip was slit in the same manner as in Example 2, except that hot air was blown to the wide metal strip by the blower in such a manner that the temperature of the wide metal strip was at 70° C.

Example 5

The wide metal strip was slit in the same manner as in Example 2, except that hot air was blown to the wide metal strip by the blower in such a manner that the temperature of the wide metal strip was at 100° C.

Example 6

A wide aluminum strip subjected to etching treatment and anodizing treatment (thickness 120 μm, etching pit: 1 μm) was slit in a predetermined width by using a manufacturing apparatus shown in FIG. 4 (cutting blades: high speed steel). At the time of slitting, ethanol was supplied to the wide metal strip from the solvent supply means in such a manner that the supply amount of the solvent in one plane of the wide metal strip was 2.5 μl/cm$^2$ Example 7

The wide metal strip was slit in the same manner as in Example 6, except that ethanol was supplied to the rotating support rolls from the solvent supply means in such a manner that the supply amount of the solvent in one plane of the wide metal strip was 3.5 μl/cm$^2$ by using the manufacturing apparatus shown in FIG. 5.

Comparative Example 1

The wide metal strip was slit in the same manner as in Example 1, except that no hot air was blown from the blower.

The slit edge surface of 300 mm of the respective aluminum sheets of Examples and Comparative Examples produced in the above-mentioned manner were observed by a microscope to find the formation number of burrs with 10 μm size or larger and occurrence of cracks.

Further, 50 wound type solid electrolytic capacitors (a rated voltage of 25V and a nominal capacitance of 10 μF) were manufactured by using a aluminum foil obtained from respective aluminum sheet produced in the above described Examples and Comparative Example as the anode foil. While the voltage 1.15 times as high as the rated voltage was applied to each solid electrolytic capacitor, aging was carried out at 125° C. for about 1 hour and the number of the defective products causing the short circuit at the time of the aging was evaluated. The results are shown in Table 1.

TABLE 1

|  | Burrs(piece(s)) | Cracks | No. of occurrence of short circuit (Specimen/50 specimens) |
| --- | --- | --- | --- |
| Example 1 | 3 | Fair | 1 |
| Example 2 | 1 | Good | 0 |
| Example 3 | 0 | Good | 0 |
| Example 4 | 0 | Good | 0 |
| Example 5 | 0 | Good | 0 |
| Example 6 | 2 | Fair | 1 |
| Example 7 | 0 | Good | 0 |
| Comparative Example 1 | 12 | Bad | 6 |

Evaluation of cracks
Good: No crack was observed at the slit edge surface
Fair: Cracks were slightly observed at the slit edge surface
Bad: Cracks were apparently observed at the slit edge surface As shown in Table 1 above, it can be understood that occurrence of burrs and cracks was decreased at the slit edge surface of the respective metal sheets of Examples obtained by slitting the wide metal strip while heating the wide metal strip and the respective metal sheets of Examples obtained by supplying the solvent to the wide metal strip and slitting between the cutting blade and the cutting blade receiving members. Particularly, it can be understood that in the case where the respective metal sheets of Examples obtained by slitting the heated wide metal strip which was supplied with the solvent, burrs and cracks was extremely reduced.

Further, it can be found that the solid electrolytic capacitors which were manufactured by using the metal foils obtained from the metal sheets produced in Examples causes short circuit very small. Consequently, according to the present examples, the number of defective products is suppressed and electrolytic capacitors can be produced at a high yield.

As described above in detail, according to one aspect of the present invention, there is provided a method for manufacturing a metal foil for an electrolytic capacitor, comprising the step of:

slitting a wide metal strip subjected to etching treatment into a predetermined size with a cutting blade, wherein the slitting portion of the wide metal strip to be brought into contact with the cutting blade is heated.

According to the above method, since the wide metal strip is heated, the hardness of the wide metal strip can be lowered and therefore, the slitting property can be improved.

In the above-described method, the slitting portion of the wide metal strip may be heated by at least one of blowing hot air to the wide metal strip and heating the cutting blade. According to the above method, it is made possible to heat the slitting portion with a simple heating means.

The above-described method may further include the step of: supplying a solvent to the wide metal strip to fill an etched portion of the wide metal strip with the solvent. The wide metal strip subjected to etching treatment has a porous etched portion. Therefore, by supplying the solvent to the wide metal strip, the etched portion is filled with the solvent and whereby, the wide metal strip is provided with stiffness.

In the above-described method, the wide metal strip may be slit between a cutting blade and a cutting blade receiving member disposed opposite to the cutting blade. According to the above method, the wide metal strip can obtain stable feeding property with the cutting blade receiving member.

In the above-described method, the wide metal strip may be slit between a first cutting blade and a second cutting blade disposed opposite to the first cutting blade. According to the above method, it is made possible to focus shearing force from the cutting blades to the slitting portion.

According to another aspect of the present invention, there is provided a method for manufacturing a metal foil for an electrolytic capacitor, comprising the steps of:

supplying a solvent to a wide metal strip subjected to etching treatment to fill an etched portion of the wide metal strip with the solvent; and slitting the wide metal strip filled with the solvent in the etched portion into a predetermined size between a cutting blade and a cutting blade receiving member disposed opposite to the cutting blade.

According to the above method, since the solvent is supplied to the wide metal strip and the etched portion is filled with the solvent, the wide metal strip can be obtained with stiffness. Further, in the case of slitting the wide metal strip filled with the solvent in the etched portion between the cutting blade and the cutting blade receiving member, since the wide metal strip in the slitting portion adheres to the cutting blade receiving member with the solvent and therefore, the wide metal strip can be closely stuck to the cutting blade receiving member.

In the above-described method, the supply amount of the solvent is preferably 2.5 to 10.0 μl per 1 cm$^2$ in one plane of the wide metal strip. In the case where the supply amount of the solvent is within the above range, the adhesion property of the wide metal strip and the cutting blade receiving member can be further improved. Furthermore, since pores of the etched portion can be sufficiently filled with the solvent, the wide metal strip can be provided with high stiffness.

According to further another aspect of the present invention, there is provided an electrolytic capacitor comprising the metal foil produced by one of the above-mentioned methods for either one or both of an anode foil and a cathode foil. According to the present invention, it is made possible to decrease occurrence of burrs and cracks at the slit edge surface. Therefore, by using such a metal foil as the anode foil or the cathode foil, it is made possible to decrease defective products having problems such as short circuit.

The present application claims priorities based on Japanese Patent Application No. 2008-63081 filed on Mar. 12, 2008 and Japanese Patent Application No. 2008-103093 filed on Apr. 11, 2008, the contents of which are hereby incorporated by reference in their entirely.

Although the present invention has been described in detail, the foregoing descriptions are merely exemplary at all aspects, and do not limit the present invention thereto. It should be understood that an enormous number of unillustrated modifications may be assumed without departing from the scope of the present invention.

What is claimed is:

1. A method for manufacturing a metal foil for an electrolytic capacitor, comprising:
   slitting a wide metal strip subjected to etching treatment into a predetermined size with a cutting blade, wherein
   the slitting portion of the wide metal strip to be brought into contact with the cutting blade is heated by blowing hot air to the wide metal strip, and
   the cutting blade slits the slitting portion in the heated state.

2. The method for manufacturing a metal foil for an electrolytic capacitor according to claim 1, wherein the wide metal strip is slit between the cutting blade and a cutting blade receiving member disposed opposite to the cutting blade.

3. A method for manufacturing a metal foil for an electrolytic capacitor, comprising:
   slitting a wide metal strip subjected to etching treatment into a predetermined size with a cutting blade, wherein
   the slitting portion of the wide metal strip to be brought into contact with the cutting blade is heated, wherein an etched portion of the slitting portion is filled with a solvent, and
   the cutting blade slits the slitting portion in the heated state.

4. The method for manufacturing a metal foil for an electrolytic capacitor according to claim 3, wherein the slitting portion of the wide metal strip is heated by at least one of blowing hot air to the wide metal strip and heating the cutting blade.

5. The method for manufacturing a metal foil for an electrolytic capacitor according to claim 3, wherein the wide metal strip is slit between the cutting blade and a cutting blade receiving member disposed opposite to the cutting blade.

6. A method for manufacturing a metal foil for an electrolytic capacitor, comprising:
   slitting a wide metal strip subjected to etching treatment into a predetermined size with a cutting blade, wherein
   the slitting portion of the wide metal strip to be brought into contact with the cutting blade is heated, wherein
   the wide metal strip is slit at the slitting portion in the heated state between a first cutting blade and a second cutting blade disposed opposite to the first cutting blade.

7. The method for manufacturing a metal foil for an electrolytic capacitor according to claim 6, wherein the slitting portion of the wide metal strip is heated by at least one of blowing hot air to the wide metal strip and heating the cutting blade.

8. The method for manufacturing a metal foil for an electrolytic capacitor according to claim 6, wherein an etched portion of the sitting portion is filled with a solvent.

9. A method for manufacturing a metal foil for an electrolytic capacitor, comprising:
   supplying a solvent to a wide metal strip subjected to etching treatment to fill an etched portion of the wide metal strip with the solvent; and
   slitting the wide metal strip filled with the solvent in the etched portion into a predetermined size between a cutting blade and a cutting blade receiving member disposed opposite to the cutting blade, wherein
   the wide metal strip is closely attached to the surface of the cutting blade receiving member with the solvent upon slitting.

10. The method for manufacturing a metal foil for an electrolytic capacitor according to claim 9, wherein the supply amount of the solvent is 2.5 to 10.0 μl per 1 cm2 in one plane of the wide metal strip.

11. A method for manufacturing a metal foil for an electrolytic capacitor, comprising:
    slitting a wide metal strip subjected to etching treatment into a predetermined size with a cutting blade, wherein
    an etched portion of the slitting portion of the wide metal strip to be brought into contact with the cutting blade is filled with a solvent upon slitting.

12. The method for manufacturing a metal foil for an electrolytic capacitor according to claim 11, wherein the wide metal strip is slit between the cutting blade and a cutting blade receiving member disposed opposite to the cutting blade.

13. The method for manufacturing a metal foil for an electrolytic capacitor according to claim 11, wherein the wide metal strip is slit between a first cutting blade and a second cutting blade disposed opposite to the first cutting blade.

* * * * *